US011370985B2

(12) United States Patent
Kiiski et al.

(10) Patent No.: US 11,370,985 B2
(45) Date of Patent: Jun. 28, 2022

(54) MULTICOMPONENT DIESEL COMPOSITION (71) Applicant: Neste Oyj, Espoo (FI)

(72) Inventors: Ulla Kiiski, Porvoo (FI); Markku Kuronen, Porvoo (FI); Kalle Lehto, Porvoo (FI); Tuukka Hartikka, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 16/469,281

(22) PCT Filed: Dec. 14, 2017

(86) PCT No.: PCT/FI2017/050887
§ 371 (c)(1),
(2) Date: Jun. 13, 2019

(87) PCT Pub. No.: WO2018/115575
PCT Pub. Date: Jun. 28, 2018

(65) Prior Publication Data
US 2020/0017785 A1 Jan. 16, 2020

(30) Foreign Application Priority Data
Dec. 19, 2016 (FI) ..................... 20165984

(51) Int. Cl.
C10L 1/185 (2006.01)
C10L 1/02 (2006.01)
(Continued)

(52) U.S. Cl.
CPC ............ C10L 1/026 (2013.01); C10L 1/1616 (2013.01); C10L 1/1852 (2013.01); C10L 10/02 (2013.01);
(Continued)

(58) Field of Classification Search
CPC ....... C10L 2270/026; C10L 2200/0446; C10L 1/1852; C10L 2290/42
See application file for complete search history.

(56) References Cited

U.S. PATENT DOCUMENTS 5,520,710 A * 5/1996 Olah ................. C10L 1/026
44/447
7,189,269 B2 * 3/2007 Clark ................ C10L 1/19
44/388
(Continued)

FOREIGN PATENT DOCUMENTS

AU    2003258753 A1 *  3/2004  ............. C10L 1/026
CN       1688673 A     10/2005
(Continued)

OTHER PUBLICATIONS

Finnish Search Report and Office Action for Priority Patent Application No. 20165984 dated Apr. 13, 2017.
(Continued)

Primary Examiner — Ellen M McAvoy
Assistant Examiner — Ming Cheung Po
(74) Attorney, Agent, or Firm — Buchanan Ingersoll & Rooney PC (57) ABSTRACT The invention discloses novel diesel fuel compositions including a renewable paraffinic diesel component, a fossil diesel component and an oxygenate component, as well as methods for manufacture and use of a combination of a renewable paraffinic diesel component, and an oxygenate component for reducing NOx emissions.

20 Claims, 1 Drawing Sheet (51) Int. Cl.
*C10L 1/16* (2006.01)
*C10L 10/02* (2006.01)
*C10L 10/12* (2006.01)

(52) U.S. Cl.
CPC ....... *C10L 10/12* (2013.01); *C10L 2200/0484* (2013.01); *C10L 2270/026* (2013.01); *C10L 2290/42* (2013.01)

(56) References Cited

U.S. PATENT DOCUMENTS

| | | | |
|---|---|---|---|
| 2002/0134008 A1 | 9/2002 | Waller et al. | |
| 2004/0106690 A1* | 6/2004 | DeHaan | C10L 1/08 518/726 |
| 2010/0242347 A1 | 9/2010 | Eberhard | |
| 2012/0132183 A1* | 5/2012 | Gunter | C10G 3/50 44/388 |
| 2014/0059923 A1 | 3/2014 | Caiazzo et al. | |
| 2021/0292669 A1 | 9/2021 | Kiiski et al. | |

FOREIGN PATENT DOCUMENTS

| | | |
|---|---|---|
| CN | 101287812 A | 10/2008 |
| EP | 1398364 A1 | 3/2004 |
| EP | 2568033 A2 | 3/2013 |
| EP | 3555240 | 10/2019 |
| EP | 3555241 | 10/2019 |
| JP | H1135954 A | 2/1999 |
| WO | 2004022674 A1 | 3/2004 |
| WO | 2012074925 A1 | 6/2012 |
| WO | 2018115574 A1 | 6/2018 |
| WO | 2018115575 A1 | 6/2018 |

OTHER PUBLICATIONS

Finnish Search Report and Office Action for Priority Patent Application No. 20165985 dated Apr. 13, 2017.
Firew et al., "The performance evaluation of diethyl-ether (DEE) additive with Diesel blends using Diesel Engine test rig", International Journal of Scientific & Engineering Research, vol. 7, Issue 6, Jun. 2016 pp. 23-29.
Happonen et al., "Diesel exhaust emissions and particle hygroscopicity with HVO fuel-oxygenate blend", Elsevier Ltd., 2012, pp. 380-386.
International Search Report (PCT/ISA/210) dated Feb. 16, 2018, by the European Patent Office as the International Searching Authority for International Application No. PCT/FI2017/050886.
International Search Report (PCT/ISA/210) dated Feb. 19, 2018, by the European Patent Office as the International Searching Authority for International Application No. PCT/FI2017/050887.
Lumpp et al., "Oxymethylene Ethers as Diesel Fuel Additives of the Future" MTZ Worldwide, vol. 72, No. 3, Mar. 1, 2011, pp. 34-38.
Marchionna et al., "High Cetane Ethers for the Reformulation of Diesel Fuels", In: 16th World Petroleum Congress, 2000, pp. 38-45.
Written Opinion (PCT/ISA/237) dated Feb. 16, 2018, by the European Patent Office as the International Searching Authority for International Application No. PCT/FI2017/050886.
Written Opinion (PCT/ISA/237) dated Feb. 19, 2018, by the European Patent Office as the International Searching Authority for International Application No. PCT/FI2017/050887.
M. Haverly et al., "Biobased Carbon Content Quantification Through AMS Radiocarbon Analysis of Liquid Fuels", Fuel, 2019, pp. 1108-1111, vol. 237.
"Bio-based Products. Bio-based Carbon Content Determination of the Bio-based Carbon Content Using the Radiocarbon Method", Finnish Standards Association, 2014. (33 pages).
"Standard Test Methods for Determining the Biobased Content of Solid, Liquid, and Gaseous Samples Using Radiocarbon Analysis", ASTM International, 2018, D6866-20.
I. Dijs et al., "Quantitative Determination by 14C Analysis of the Biological Compotent in Fuels", Radiocarbon, 2006, pp. 315-323, vol. 48, No. 3.
Office Action dated Aug. 6, 2021, by the U.S Patent and Trademark Office in U.S. Appl. No. 16/469,348.

* cited by examiner

MULTICOMPONENT DIESEL COMPOSITION

FIELD OF THE INVENTION

The present disclosure is related to the field of diesel compositions and to manufacturing diesel composition having improved properties. More specifically, it is related to diesel compositions comprising at least three components, a fossil diesel component, a renewable paraffinic diesel component and an oxygenate, providing benefits with diesel emissions. It is also related to a method for producing said compositions. Further, it is related to use of a combination of renewable paraffinic diesel component and oxygenate as fuel blending components to fossil fuel.

BACKGROUND

Oxygenates have been studied as diesel components for fossil fuels, before renewable diesels rose attention. Typically, an improvement achieved with an oxygenate in one of diesel characteristics, for example higher cetane number, better cold properties or reduced emissions, have been compromised by a deficit in another. For example, certain ethers combined with fossil diesel have been shown to reduce particulate matter (PM) emissions, but such an advantage is burdened with an increase in $NO_x$ emissions.

On the other hand, recently the regulations and concern for environment have encouraged the use of renewable fuels. Oxygenates have been studied as components in renewable diesel or biodiesel as well. Publication WO2012074925 envisions a composition comprising renewable diesel, which they call RHE, and oxygenates. Both components are discussed very generally. As possible oxygenates, it discusses esters, ethers and/or hemiacetals comprising alcohols, polyols or combinations thereof. However, in experimental part, no actual tests are conducted. Publication WO2012074925 also lists several references to measuring techniques and possible outcome thereof.

Publication EP1398364 claims a composition comprising 0.1-99% paraffinic diesel component, 0-20% compound containing oxygen and the rest can be regular crude oil based diesel. Said component containing oxygen may be selected from aliphatic alcohols, ethers, fatty acid esters, water or mixtures thereof. A blend of fossil diesel fuel 40% and hydrogenated and isomerized tall oil fatty acids (TOFA) 60% was characterized. In another example, a 70/30 blend of fossil diesel fuel and an ester was compared to another blend, 70/30, of fossil diesel and TOFA, which showed how the ester seemed to affect an increase in both $NO_x$ and PM emissions. The desired result in reduced emissions was obtained only by the two component blend of fossil diesel and hydrogenated and isomerized TOFA. No results from blends comprising three components were presented. Thus, there is a need to provide further diesel fuel compositions comprising oxygenates while reducing harmful effects typically related thereto.

SUMMARY

As the first aspect, there is provided a diesel composition comprising:
a) fossil diesel component
b) oxygenate component from 1 vol-% to 10 vol-%, preferably from 5 vol-% to 10 vol-% of the total fuel composition volume, wherein
  i. said oxygenate is a monoether having molar mass from 128 to 300 g/mol, and
  ii. said oxygenate is of structure $$R_1—O—R_2 \qquad \text{(formula 1)},$$

in which formula $R_1$ and $R_2$ are same or different and selected from $C_1$-$C_{15}$ alkyl groups, and
c) renewable paraffinic diesel component from 5 vol-% to 15 vol-% of the total fuel composition volume,
  wherein the sum of said oxygenate component and said renewable paraffinic diesel component is from 6 to 25 vol-%, preferably from 10 vol-% to 20 vol-% of the total fuel composition volume.

Against expectations, compositions containing renewable paraffinic diesel fuel from 5 to 15%, a monoether oxygenate component having molar mass from 128 to 300 g/mol from 1 to 10% and fossil diesel, have been shown to reduce $NO_x$ emissions. Without being bound to a theory, the surprising reduction in $NO_x$ emissions with this specific blend is considered to be due to renewable paraffinic diesel component present in said composition.

According to a preferred embodiment, composition comprises renewable paraffinic diesel fuel from 5 to 15 vol-%, a monoether oxygenate component 1-10 vol-% and regular (fossil) diesel from 75 to 94 vol-%, wherein the renewable paraffinic diesel component is produced by a hydrogenation process of vegetable oil, animal fat, fish fat, fish oil, algae oil, microbial oil and/or wood and/or other plant based oil as well as recyclable waste and/or residue or a combination thereof, or preferably by a hydrodeoxygenation-isomerization process thereof, which have shown excellent performance in emission experiments. Without binding to any theory, the results indicate that the characteristic paraffin profile of the renewable paraffinic diesel component acts synergistically with the monoether having molar mass from 128 to 300 g/mol providing a beneficial effect on the cetane number in fuel blends.

The oxygenate component is advantageously selected to provide desired characteristics to the blend. Monoethers studied for their properties in blends showed some variability as to cetane number and cold properties. Depending on the desired diesel characteristics, selections among monoethers could be made. Symmetrical and asymmetrical straight chain monoethers provide increase in cetane number in addition to desired emission effects. According to unexpected results in emission tests, the most preferable oxygenate is di-n-pentyl-ether (DNPE).

According to the second aspect there is provided a method for producing a blend fuel, wherein the renewable paraffinic diesel component is produced from a renewable feedstock by a process selected from
  a) hydrogenation or deoxygenation of vegetable oil, animal fat, fish fat, fish oil, algae oil, microbial oil and/or wood and/or other plant based oil as well as recyclable waste and/or residue or combinations thereof to obtain a paraffinic $C_9$-$C_{24}$ hydrocarbon fraction, which is optionally subjected to isomerization, or
  b) gasification of biomass to produce syngas and production of paraffins from said syngas by Fischer-Tropsch synthesis to obtain a paraffinic $C_9$-$C_{24}$ hydrocarbon fraction, or
  c) a combination thereof, and blending the renewable paraffinic diesel component thereby obtained, with a monoether oxygenate component having molar mass from 128 to 300 g/mol; and with fossil diesel component to obtain a diesel composition as described above.

According to the third aspect, herein is provided use of a monoether oxygenate having molar mass from 128 to 300 g/mol and renewable paraffinic diesel as fuel blending components to fossil diesel component to obtain a fuel composition, wherein the total fuel composition comprises from 1 vol-% to 10 vol-% of monoether oxygenate, and from 5 vol-% to 15 vol-% renewable paraffinic diesel and the sum of said oxygenate component and said renewable paraffinic diesel component is from 6 to 25 vol-%, preferably from 10 vol-% to 20 vol-%, wherein vol-% is calculated of the total fuel composition volume.

An advantage achieved by the present fuel composition, method and use is the decrease in $NO_x$ emissions. As evidenced by the examples, the oxygenate content of fuel compositions could be increased with composition containing said components in said proportions, but $NO_x$ emissions were not increased as expected. The advantageous effect was observed in particular in blends comprising fossil fuel.

According to a further aspect, in composition or use the oxygenate component or raw material therefor, is derived from biomass, whereby it can be considered as renewable component. Together with renewable paraffinic diesel component it contributes to the percentage of renewable, non-fossil components in the total fuel composition.

DETAILED DESCRIPTION

A fuel composition as used herein refers to diesel fuel complying with standards. The proportions of components are discussed here as percentages of the total fuel composition volume.

In the context of fuel composition, the sum amount of the oxygenate component as defined in claim 1, and said renewable paraffinic diesel component is of special interest. In the context of diesel blends, they can be considered as the most relevant blend components to fossil diesel, the sum amount of which is from 6 to 25%, preferably from 10 vol-% to 20 vol-% of the total fuel composition volume.

According to a preferable embodiment, in which the oxygenate component consists of ethers derived from renewable sources, i. e. biomass, the sum amount of said oxygenate and said renewable paraffinic diesel sets also the amount of renewable components or biocomponents of the total fuel composition, varying from 6 to 25 vol-%, preferably from 10 vol-% to 20 vol-% of the total fuel composition volume.

Parameters measured herein comprise both physical and chemical characteristics of diesel fuel and components thereof as well as analyses relating to combustion in a diesel engine and emissions. Common emissions include unburned hydrocarbons (HC), carbon monoxide (CO), nitrogen oxides (NOx) or particulate matter (PM). Emissions are regulated by variable standards depending on geographics, international agreements, engine types etc. Effects obtained herein are not dependent on a specific standard, but instead evidenced as decrease against a reference fuel for which experiments were conducted exactly the same manner.

Renewable Paraffinic Diesel Component

Renewable paraffinic diesel component refers here to paraffinic hydrocarbons, n-paraffins or a mixture of straight chain and branched paraffins, derived from biomass. Two approaches dominate, hydrotreating oils or fats of bio-origin or fuels made by Fischer-Tropsch synthesis of gasified biomass (BTL).

It is noted that paraffins exist also in fossil diesel fuels which additionally contain significant amounts of aromatics and naphthenics. Renewable paraffinic diesel component is practically free of aromatics and has properties quite similar to GTL and BTL diesel fuels made by Fischer Tropsch synthesis from natural gas and gasified biomass.

GTL

Gas to liquid, GTL, is a Fischer-Tropsch derived fuel having a similar cloud point than a fuel derived by hydrotreating triglycerides, fatty acids and fatty acid derivatives. GTL is characterized by broad distribution of paraffinic hydrocarbons in the range $C_9$-$C_{24}$. GTL has typically a cetane number in the range 73-81.

BTL

When the synthesis gas used in Fischer-Tropsch process originates from gasification of biomass, the process may be referred to as "biomass to liquid", "BTL". Broad distribution of n-paraffinic hydrocarbons in the range $C_9$-$C_{24}$ is obtainable, even though selection of a fraction or fractions could be more specific. In an embodiment, product or a part of it may be subject to isomerization, wherein n-paraffins are at least partly converted to branched chain paraffins, i. e. isomerized.

Hydrotreated Renewable Paraffinic Diesel Component

The hydrotreated renewable paraffinic diesel component is obtainable by hydrotreating vegetable oil, animal fat, fish fat, fish oil, algae oil, microbial oil and/or wood and/or other plant based oil as well as recyclable waste and/or residue or a combination thereof. "Hydrotreated Vegetable Oil" or "Hydrogenated Vegetable Oil" was a common term used during last decade when only vegetable oils were used as feedstocks. Currently more and more of renewable paraffinic diesel is produced by hydrotreatment from waste and residue fat fractions coming from food, fish and slaughterhouse industries, as well as from non-food grade vegetable oil fractions.

In an embodiment the renewable paraffinic diesel component comprises hydrotreated renewable diesel, or consists of hydrotreated renewable diesel. Hydrotreating typically produces bio based middle distillate fuels. The hydrotreated renewable diesels are distinct from "bio-diesel" which is a term reserved for the fatty acid methyl esters (FAME). Chemically hydrotreated vegetable oils are mixtures of paraffinic hydrocarbons and have a very low quantity of sulfur and aromatics. Cold properties of hydrotreated renewable paraffinic diesel can be improved to meet any local requirements by increasing the amount of i-paraffins by controlling the process parameters or by additional catalytic processing.

In an embodiment the renewable paraffinic diesel component in the fuel composition comprises hydrotreated vegetable oil, hydrotreated animal fat, hydrotreated fish fat, hydrotreated fish oil, hydrotreated algae oil, hydrotreated microbial oil, hydrotreated wood and/or other plant based oil, hydrotreated recyclable waste and/or residue or a combination thereof. In a preferred embodiment said renewable paraffinic diesel component consists of hydrotreated vegetable oil, hydrotreated wood and/or other plant based oil, hydrotreated animal fat, hydrotreated fish fat and oil, hydrotreated algae oil, hydrotreated microbial oil, hydrotreated recyclable waste, hydrotreated recyclable residue, or a combination thereof.

In an embodiment in the hydrotreated renewable paraffinic diesel component the amount of the paraffinic components in the range of carbon number $C_{15}$-$C_{18}$ is at least 70 vol-%, more preferably more than 80 vol-%, most preferably more than 90 vol-%. When a hydrotreated renewable paraffinic diesel component having said paraffinic component profile is used, a fuel composition of increased cetane number is obtained.

In an embodiment the amount of the paraffinic components in the hydrotreated renewable paraffinic diesel component in the range of carbon number $C_3$-$C_{14}$ is less than 25 vol-%, such as less than 20 vol-%, less than 10% vol-%, or less than 7 vol-%. Optionally in the hydrotreated renewable paraffinic diesel component the amount of the paraffinic components in the range of carbon number $C_{19}$-$C_{24}$ is less than 25 vol-%, such as less than 20 vol-%, less than 10 vol-%, or less than 5 vol-%.

In an embodiment the renewable paraffinic diesel component consists of renewable paraffinic diesel component having a cetane number of at least 70, preferably at least 75. By using a renewable paraffinic diesel component having high cetane number, a smaller addition of renewable paraffinic diesel component and a monoether oxygenate having molar mass from 128 to 300 g/mol provides increased cetane number in a blend comprising a fossil diesel component, but is not compromised by a NOx emission increase.

In an embodiment the content of the hydrotreated renewable paraffinic diesel component in the fuel composition is in the range of 5-15 vol-%. In an embodiment the content of the hydrotreated renewable paraffinic diesel component in the total fuel composition is 5, 6, 7, 8, 9, 10, 11, 12, 13, 14 or 15 vol-%.

In an embodiment fatty acids or triglycerides are first hydrogenated to n-paraffins and n-paraffins are then at least partly converted to branched chain paraffins, i. e. isomerized.

Monoether

The ether component contributes to the fuel composition as an oxygenate. Generally oxygenates used in fuels include various alcohols, ethers, esters and carbonates. However, since hydrocarbons comprising oxygen is a very broad and versatile group of chemicals, different oxygenates contribute to different diesel properties and a trade-off to others is often unavoidable. Typically oxygenates decrease particulate emissions, but have a tendency to increase NOx emissions at the same time.

To be compatible and soluble to diesel, the oxygenate is selected from monoethers having molar mass from 128 to 300 g/mol, preferably from 150 to 250 g/mol, and more preferably from 150 to 190 g/mol. This molar mass range provides best compatibility to diesels. Monoether refers to a compound comprising only one ether functionality. Said monoethers may be characterized by a formula $R_1$—O—$R_2$, wherein $R_1$ and $R_2$ are same or different and selected from straight chain or branched $C_1$-$C_{15}$ alkyls, also known as $C_1$-$C_{15}$ n-alkyls and i-alkyls respectively.

Ethers suitable for present diesel composition comprise symmetrical or unsymmetrical monoethers. In the context of the present fuel composition, the oxygenate component may comprise substantially one monoether or a mixture of monoethers within above definition.

According to one embodiment, $R_1$ and $R_2$ are selected form straight chain $C_1$-$C_{15}$ alkyls, also known as $C_1$-$C_{15}$ n-alkyls. Straight chain ethers have ignition properties better than typical fossil diesel fuel as such. Straight chain ethers having total carbon number of at least 10 are known to have excellent properties as diesel components.

Preferably the oxygenate herein used comprises one of straight chain symmetrical monoethers, wherein formula 1 is of form $R_1$—O—$R_1$. Such monoethers comprise compounds known to have a high cetane number, such as di-n-pentyl-ether (DNPE), di-n-hexyl-ether (DNHE), di-n-heptyl-ether (DNHpE), di-n-octyl-ether (DNOE), di-n-nonyl-ether (DNNE) and di-n-decyl-ether (DNDE). Furthermore, production of symmetrical monoethers from one alcohol only provides advantages both as non-complexity and economics. DNPE was used as oxygenate in present experiments and provided unexpected decrease in NOx emissions as certain blend with fossil diesel component and renewable paraffinic diesel component. Symmetric monoethers of formula $R_1$—O—$R_1$ can be produced according to known methods. Typically symmetrical ethers may be prepared from their corresponding alcohols over acid catalysts. At high temperatures, reactions catalyzed by aluminium oxide are also known.

Asymmetrical straight chain monoethers, i.e. ethers according to formula $R_1$—O—$R_2$, wherein $R_1$ and $R_2$ are both straight chain $C_1$-$C_{15}$ alkyls but different in carbon chain length, may be produced by well-known standard processes. A well-known example is the reaction of an alkyl halide with a sodium alkoxide, by Williamson ether synthesis. Suitable asymmetrical monoethers comprise those of high cetane number within molar mass range specified. Asymmetrical straight chain monoethers may be selected from compounds according to above specifications, such as ethyl-dodecyl ether, ethyl-undecyl ether, ethyl-decyl ether, ethyl-nonyl ether (ENE), ethyl-octyl ether, propyl-dodecyl ether, propyl-undecyl ether, propyl-decyl ether, propyl-nonyl ether, propyl-octyl ether, propyl-heptyl ether, butyl-dodecyl ether, butyl-undecyl ether, butyl-dekyl ether (BDE), butyl-nonyl ether, butyl-heptyl ether, butyl-hexyl ether, pentyl-dodecyl ether, pentyl-undecyl ether, pentyl-decyl ether (PDE), pentyl-nonyl ether, pentyl-octyl ether, pentyl-heptyl ether, or pentyl-hexyl ether.

Monoethers comprising straight carbon chain alkyls are preferred, since they provide better cetane number to blends than monoethers comprising at least one branched carbon chain.

The oxygenate component may be selected from asymmetrical branched monoethers i.e. ethers according to formula $R_1$—O—$R_2$, wherein $R_1$ and $R_2$ are different $C_1$-$C_{15}$ alkyls and at least one of which is branched. Within the molar mass range from 128 to 300 g/mol, such ethers comprise among others, ethers comprising tert-butyl as one of the carbon chains, i.e. as $R_1$ or $R_2$, such as octyl-tert-butyl ether (OTBE), dodecyl-tert-butyl ether (DOTBE) and ethylhexyl-tert-butyl ether (EHTBE). Preferably the molar mass range is from 150 to 190 g/mol.

According to another embodiment, the oxygenate component may be selected from symmetrical branched monoethers i.e. ethers according to formula $R_1$—O—$R_2$, wherein $R_1$ and $R_2$ are the same $C_1$-$C_{15}$ alkyls and branched. An example of branched symmetrical monoethers within range comprise i.e. di-ethylhexyl ether (DEHE).

According to one embodiment, the oxygenate component of the composition comprises a renewable oxygenate, preferably the oxygenate component consists of a renewable oxygenate. Oxygenates may be produced by selecting the starting materials, typically alcohols, originating from biomass or biomass waste streams. When the oxygenate component is derived from biomass, it can be classified as renewal and thereby contributes to total share of renewal components in the composition. In such a case, sum of renewable components, i.e. sum of the renewable oxygenate and the renewable paraffinic diesel is from 6 to 25 vol-% and preferably from 10 vol-% to 20 vol-% of the total fuel composition volume.

Fossil Diesel Component

The fossil diesel component means a component or composition, which is naturally occurring and derived from non-renewable sources. Examples of such non-renewable resources include petroleum oil/gas, shale oil/gas, natural gas or coal deposits, and the like, and combinations thereof, including any hydrocarbon-rich deposits that can be utilized from ground/underground sources. The term fossil also refers to recycling material of non-renewable sources.

In an embodiment the fossil diesel component is fossil middle distillate, preferably fossil diesel. Diesel fuel in general is any liquid fuel suitable for use in diesel engines, where fuel ignition takes place without spark, as a result of compression of the inlet air mixture and then injection of fuel. The most common type of diesel fuel is a specific fractional distillate of fossil fuel, preferably petroleum fuel oil. Distillation characteristics define how fuel is evaporated when it is sprayed into the combustion chamber of a diesel engine. Standards (e.g. EN590) include information about typical distillation characteristics.

To distinguish from alternative diesel fuels not derived from petroleum, petroleum-derived diesel is called herein as fossil diesel. It may also be called as e.g. petrodiesel, mineral diesel or petroleum distillate. Fossil diesel can comprise atmospheric or vacuum distillates. The distillate can comprise cracked gas oil or a blend of any proportion of straight run or thermally or catalytically cracked distillates. The distillate fuel can be subjected to further processing such as hydrogen-treatment or other processes to improve fuel properties. Typically fossil diesel comprise naphtenics about 10-50 weight %, monoaromatics about 5-30 weight %, other polyaromatics about 0-8 weight % and paraffins about 10-50 weight %.

The present diesel fuel composition comprises fossil diesel component from 75 vol-% to 94 vol-%. Because of the predominant proportion, fossil diesel component in also referred to as the blend base to which renewable paraffinic diesel component and oxygenate component are mixed as blend components. Use of a high fossil diesel component content is beneficial, because fossil diesels are well known and compatible with diesel engines. According to an embodiment the diesel fuel composition comprises fossil diesel component from 85 vol-% to 94 vol-% of the total fuel volume.

Final fuel composition may contain refinery and performance additives such as lubricity, cold flow, antistatic and detergent additives.

EXAMPLES

The following examples are provided to illustrate various aspects herein. They are not intended to be limiting.

Example 1. Combustion Experiments

Method/Measurements

Engine tests were performed with a single cylinder test engine. Four test fuels having the same components as different blend proportions were analyzed. Fossil EN 590 summer grade was used as reference fuel and represented the fossil diesel component in blends. The renewable paraffinic diesel and a monoether as oxygenate were further components. In the test procedure the test matrix was designed to combine two speeds and three loads per speed.

For exhaust measurements a single cylinder test engine with free valve lift and timing and fully adjustable injection parameters was used. Charge and exhaust pressure were also adjustable. Cylinder pressure, fuel consumption and four different emissions, CO, HC, NOx, and particulates were measured.

Particulate mass (PM) emission measurements were performed according to ISO8178-1:2006.

AVL SPC472 Smart Sampler was used for the measurements. Sample was taken from raw exhaust gas and diluted with a dilution factor of 6. Sampling time varied from 90 to 600 seconds depending on particulate concentration and pressure drop of the sample filter. Samples were collected on 47 mm TX40HI20-WW Pallflex filters. The filter flow was set to 1.3 g/s (60 nl/min) and the filter temperature was kept in between 42-50° C. Sample filters were weighed before and after the measurements in a climatic room in which the temperature and humidity were controlled. Minimum of 2 hours stabilisation time were used for the filters before weighing.

The flow calibration of Smart Sampler was checked on daily basis and adjusted when needed. During the measurements campaign the need for adjustments was negligible. On each measurement point 2-3 samples were collected. The reference fuel was measured in the beginning and after the measurement period. Test matrix is given in table 1.

TABLE 1

Parameters for test points studied.

| Test point | Charge air mass flow [kg/h] | Charge air temperature [Deg C.] | Charge air back pressure [bar] | Injection timing [DBTDC] | Injection pressure [bar] |
| --- | --- | --- | --- | --- | --- |
| 1700 rpm 70% load | 163 | 28 | 1.81 | 12 | 1400 |
| 1700 rpm 50% load | 104 | 28 | 0.69 | 9 | 1399 |
| 1300 rpm 100% load | 138 | 28 | 1.78 | 10 | 1200 |
| 1300 rpm 80% load | 115 | 28 | 0.95 | 8 | 1200 |
| 1300 rpm 65% load | 80 | 28 | 0.53 | 7 | 1200 |

Results

Figure 1:
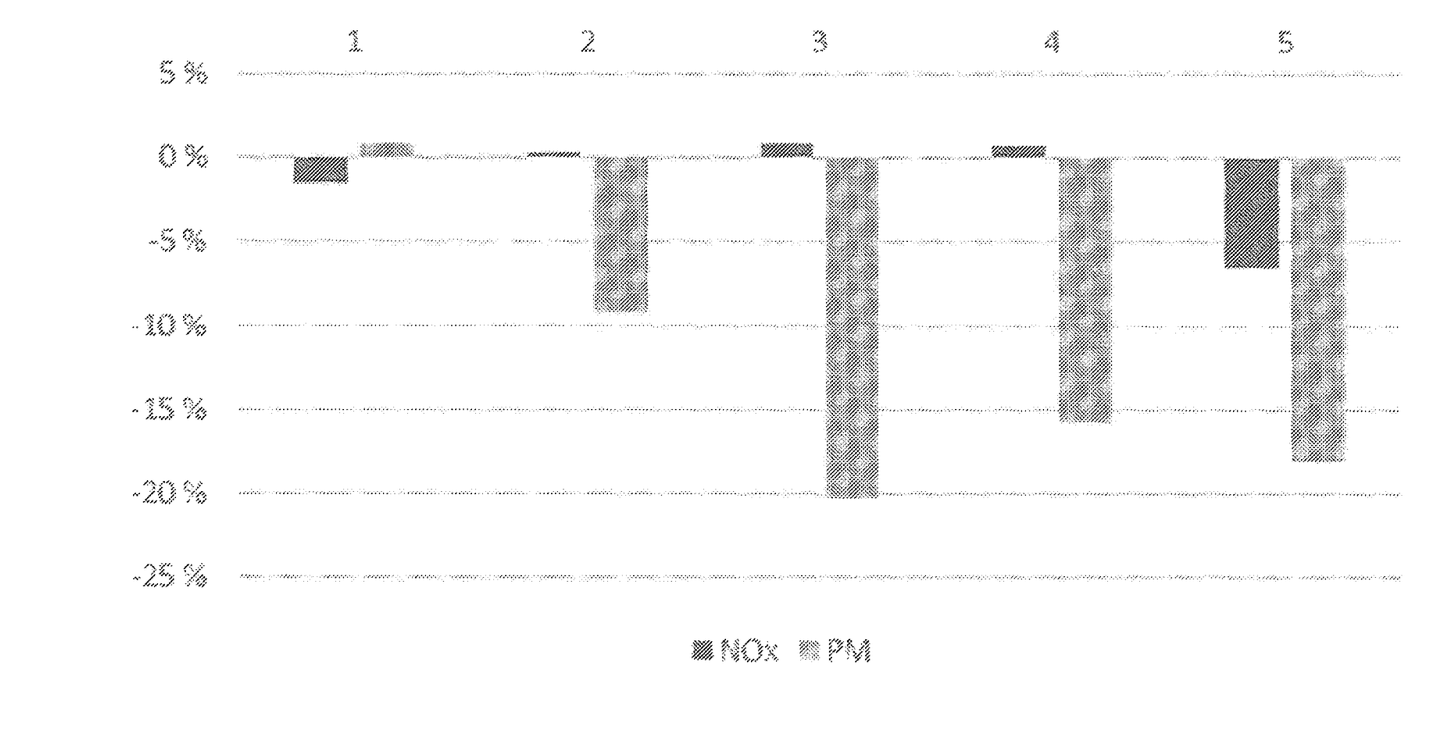
FIG. 1 shows how a blend comprising 10 vol-% of DNPE, 10 vol-% renewable paraffinic diesel and 80 vol-% fossil diesel component unexpectedly reduced NOx emissions in experiments conducted.

The emission results measured with reference fuel are not presented alone, but used as reference level in FIG. 1 presenting overall performance of different blend compositions. The exact compositions shown in FIG. 1 are compiled in table 2. All compositions are not according to present claims but shown as reference. The final results have been calculated according to ISO8178-1:2006. Individual load/rpm points are not presented here. Instead, averages for each mixture are shown in FIG. 1.

TABLE 2

Compositions of blends tested and shown in FIG. 1.

| Sample | Oxygenate | Renewable diesel | Fossil diesel 1 | Density (15° C.) | Viscosity (40° C.) | Cetane number | Distillation IBP | Distillation FBP | Lower heating value |
|---|---|---|---|---|---|---|---|---|---|
| unit standard | vol-% | vol-% | vol-% | kg/m3 EN ISO 12185 | mm2/s EN ISO 3104 | ASTM D6890 | ° C. EN ISO 3405 | ° C. EN ISO 3405 | MJ/kg ASTMD 4809 |
| 1 | 10 | 10 | 80 | 824.5 | 3.04 | 63.4 | 179.8 | 359.5 | 42.8 |
| 2 | 10 | 30 | 60 | 813.6 | 2.907 | 67.7 | 184.9 | 356.1 | 42.9 |
| 3 | 20 | 10 | 70 | 820.3 | 2.662 | 68.5 | 178.2 | 347.1 | 42.4 |
| 4 | 20 | 30 | 50 | 808.5 | 2.517 | 74.5 | 179.6 | 353.2 | 42.4 |
| 5 | — | 100 | — | 779.8 | 2.919 | 78.9 | 209.9 | 301.9 | 43.8 |

The present experiments show unexpected decrease in NOx emissions result, wherein the total amount of blend components was only 20 vol-% leaving the fossil diesel component content as high as 80 vol-%. FIG. 1 shows surprisingly that a reduction in NOx emissions was observed with mixture comprising 10 vol-% of DNPE and 10 vol-% of renewable paraffinic diesel in 80 vol-% of fossil diesel component. Other mixtures showed increase in NOx emissions, even though it is considerably lower increase than expected.

It is acknowledged also, that potential for further NOx emission reduction by engine calibration may exist.

Example 2: Ether Testing

Several ethers, both symmetrical and asymmetrical, were tested in fossil diesel for their characteristics as mixtures containing oxygen from 1 to 2 wt-% in fossil diesel. The fossil diesel used as both reference diesel and blend base varied slightly for different experiment series (fossil diesel 2 and 3). Both straight and branched chain ethers were studied. Depending on the carbon chain length, the desired oxygen content was achieved with different ether concentrations in diesel. Standard methods were applied and the results are compiled in tables 3 and 4 (symmetrical straight chain), table 5 (asymmetrical straight chain) and table 6 (asymmetrical branched).

TABLE 3

Characteristics measured for ether-diesel mixtures for straight chain symmetrical monoethers according to the claimed composition.

| | ASTM | Fossil diesel 2 | 89.3% Fossil diesel 2 10.7% DNPE | 84.7% Fossil diesel 2 15.3% DNOE | 69.3% Fossil diesel 2 30.7% DNOE | 81.3% Fossil diesel 2 18.7% DNDE |
|---|---|---|---|---|---|---|
| Density (15° C.) kg/m³ | D4052 | 816.1 | 812.6 | 815.2 | 814.4 | 816.9 |
| kV (15° C.) mm²/s | D445 | 2.62 | 2.35 | 2.79 | 3.06 | 3.26 |
| Cloud point ° C. | D2500 | −48 | <−46 | −41 | −30 | −9 |
| Flash point° C. | D93 | 75 | | | | 76 |
| Distillation IBP° C. | D86 | 174 | 189 | 195 | 199 | 181 |
| Distillation FBP° C. | | 291 | 283 | 286 | 286 | 335 |
| Cetane number | D613 | 48 | 53.9 | 59.9 | 70 | 57.8 |
| Oxyg. blend cetane number bCN | | | 104.7 | 125.8 | 119.7 | 100.4 |
| Oxygen (calc) %-wt | | 0 | 1 | 1 | 2 | 1 |
| Carbon (calc) %-wt | | 85.9 | 84.8 | 84.8 | 83.8 | 84.8 |
| Hydrogen (calc) %-wt | | 14.1 | 14 | 14 | 14 | 14 |

TABLE 4

Further straight chain symmetrical monoether characteristics and some values concerning ether-diesel mixture.

| | Method | Fossil diesel 3 | 90% Fossil diesel 3 10% DNHE |
|---|---|---|---|
| Density (15° C.) kg/m³ | EN ISO12185 | 818.4 | 816.3 |
| Cloud point ° C. | ASTM D7689 | −28.6 | −29.5 |
| Cetane number | ASTM D6890 | 47.5 | 57 |
| Oxyg. blend cetane number bCN | | | 142 |
| Oxygen (calc) %-wt | | 0 | 0.8 |

TABLE 5

Characteristics measured for ether-diesel mixtures for straight chain asymmetrical monoethers according to the claimed composition.

| | ASTM | Fossil diesel 2 | 88.3% Fossil diesel 2 11.7% ENE | 86.0% Fossil diesel 2 14.0% BDE | 86.0% Fossil diesel 2 14.0% PDE |
|---|---|---|---|---|---|
| Density (15° C.) kg/m³ | D4052 | 816.1 | 813.3 | 814.7 | 814.6 |
| kV (15° C.) mm²/s | D445 | 2.62 | 2.44 | 2.73 | 2.83 |
| Cloud point ° C. | D2500 | −48 | <−46 | <−45 | −47 |

TABLE 5-continued

Characteristics measured for ether-diesel mixtures for straight chain asymmetrical monoethers according to the claimed composition.

| | ASTM | Fossil diesel 2 | 88.3% Fossil diesel 2 11.7% ENE | 86.0% Fossil diesel 2 14.0% BDE | 86.0% Fossil diesel 2 14.0% PDE |
|---|---|---|---|---|---|
| Flash point° C. | D93 | 75 | | 76 | |
| Distillation IBP° C. | D86 | 174 | 194 | 205 | 197 |
| Distillation FBP° C. | | 291 | 285 | 286 | 284 |
| Cetane number | D613 | 48 | 53.4 | 56 | 56.3 |
| Oxyg. blend cetane number bCN | | | 94.1 | 105.1 | 107.3 |
| Oxygen (calc) %-wt | | 0 | 1.1 | 1 | 2 |
| Carbon (calc) %-wt | | 85.9 | 84.8 | 84.8 | 84.8 |
| Hydrogen (calc) %-wt | | 14.1 | 14 | 14 | 14 |

All compounds mentioned here were soluble in diesel fuel. During cold storage, (about −18° C.), no crystallization or phase separation was observed with any of said ethers studied. These results together with parameters in tables 3-5, indicate that with these ethers, similar emission results may be achieved as achieved in example 1 for compositions comprising fossil diesel, renewable paraffinic diesel and a symmetrical, straight chain monoether, DNPE. It can be deduced that monoethers having molar mass within range from 128 to 300 g/mol such as symmetrical DNOE, DNDE, asymmetrical ENE, BDE, and PDE, perform similarly to DNPE in diesel blends.

TABLE 6

Characteristics measured for ether-diesel mixtures for branched chain asymmetrical monoethers according to the claimed composition, method and use.

| | ASTM | Fossil diesel 2 | 88.0% Fossil diesel 2 12.0% EHTBE | 76.0% Fossil diesel 2 24.0% EHTBE | 76.0% Fossil diesel 2 24.0% OTBE | 84.7% Fossil diesel 2 15.3% DOTBE |
|---|---|---|---|---|---|---|
| Density (15° C.) kg/m³ | D4052 | 816.1 | 813.6 | 810.9 | 810.4 | 814.9 |
| kV (15° C.) mm²/s | D445 | 2.62 | 2.55 | 2.43 | 2.56 | 2.96 |
| Cloud point ° C. | D2500 | −48 | <−45 | <−45 | <−45 | <−45 |
| Flash point° C. | D93 | 75 | 71 | 72 | 74 | 74 |
| Distillation IBP° C. | D86 | 174 | 178 | 170 | 186 | 182 |
| Distillation FBP° C. | | 291 | 286 | 285 | 286 | 287 |
| Cetane number | D613 | 48 | 45.3 | 44.3 | 48.3 | 52.1 |
| Oxyg. blend cetane number bCN | | | 25.5 | 32.6 | 49.3 | 74.8 |
| Oxygen (calc) %-wt | | 0 | 1 | 2 | 2 | 1 |
| Carbon (calc) %-wt | | 85.9 | 84.8 | 83.8 | 83.8 | 84.8 |
| Hydrogen (calc) %-wt | | 14.1 | 14 | 14 | 14 | 14 |

Since several ethers listed in the above tables have cetane number greater than that of fossil diesel, they contribute to increase in cetane number of claimed compositions. As another advantage, it can be concluded that with such ethers lower blend ratio of components contributing to cetane number are required in compositions according to present compositions in order to meet cetane number requirements in EN590 and ASTM D975. It is especially beneficial in producing premium diesel grades with higher cetane number. Based on this reasoning, the oxygenate component is preferable selected from the group of DNPE, DNOE, DNDE, BDE, DNHE, and PDE.

As summary, ethers tested for their desirable blend characteristics comprised di-n-dekyl ether, di-n-octyl ether, di-n-pentyl ether, di-n-hexyl ether, ethyl-nonyl ether, butyl-dekyl ether, pentyl-dekyl ether, octyl-tert-butyl ether, dodecyl-tert-butyl ether, ethyl-hexyl-tert-butyl ether.

The foregoing description has provided by way of non-limiting examples of particular implementations and embodiments, a full and informative description of the best mode presently contemplated by the inventors for carrying out the present composition and method thereof. It is however clear to a person skilled in the art that the disclosure is not restricted to details of the embodiments presented above, but that it can be implemented in other embodiments using equivalent means without deviating from the characteristics of the present composition and method thereof.

Furthermore, some of the features of the above-disclosed embodiments may be used to advantage without the corresponding use of other features. As such, the foregoing description should be considered as merely illustrative of the principles of the present composition and method thereof, and not in limitation thereof. Hence, the scope is only restricted by the appended patent claims.

The invention claimed is:

1. A fuel composition, comprising:
   a) a fossil diesel component;
   b) an oxygenate component in an amount from 1 vol-% to 10 vol-%, of a total fuel composition volume, wherein:
      i. said oxygenate is a monoether having a molar mass from 128 to 300 g/mol, and
      ii. said oxygenate is of a structure:

$$R_1\text{—}O\text{—}R_2 \quad \text{(formula 1)},$$

in which formula $R_1$ and $R_2$ are same or different and selected from $C_1$-$C_{15}$ alkyl groups; and
   c) a renewable paraffinic diesel component in an amount from 5 vol-% to 15 vol-% of the total fuel composition volume, wherein the renewable paraffinic diesel is produced by a hydrogenation process of vegetable oil, animal fat, fish fat, fish oil, algae oil, microbial oil and/or wood and/or other plant based oil, recyclable waste and/or residue or a combination thereof, or by a hydrodeoxygenation-isomerization process thereof;
   wherein a sum amount of said oxygenate component and said renewable paraffinic diesel component is from 6 to 25 vol-%, of the total fuel composition volume.

2. The composition according to claim 1, wherein said oxygenate component is selected from symmetrical or asymmetrical straight chain monoethers, having molar mass from 150 to 300 g/mol.

3. The composition according to claim 1, wherein said oxygenate component is selected from a group consisting of:

di-n-nonyl ether, di-n-dekyl ether, di-n-octyl ether, di-n-heptyl ether, di-n-pentyl ether, di-n-hexyl ether, ethyl-dodecyl ether, ethyl-undecyl ether, ethyl-decyl ether, ethyl-octyl ether, propyl-dodecyl ether, propyl-undecyl ether, propyl-decyl ether, propyl-nonyl ether, propyl-octyl ether, propyl-heptyl ether, butyl-dodecyl ether, butyl-undecyl ether, butyl-nonyl ether, butyl-heptyl ether, butyl-hexyl ether, pentyl-dodecyl ether, pentyl-undecyl ether, pentyl-nonyl ether, pentyl-octyl ether, pentyl-heptyl ether, or pentyl-hexyl ether, ethyl-nonyl ether, butyl-dekyl ether, pentyl-dekyl ether, octyl-tert-butyl ether, dodecyl-tert-butyl ether, ethyl-hexyl-tert-butyl ether, di-ethylhexyl ether, and mixtures thereof.

4. The composition according to claim 1, wherein said renewable paraffinic diesel component comprises:
hydrocarbons produced from biomass hydrotreatment of vegetable oil, animal fat, fish fat, fish oil, algae oil, microbial oil and/or wood and/or other plant based oil as well as recyclable waste and/or residue or a combination thereof to obtain a paraffinic $C_9$-$C_{24}$ hydrocarbon fraction, optionally followed by isomerization, or a combination thereof.

5. The composition according to claim 1, wherein said renewable paraffinic diesel component comprises:
hydrotreated vegetable oil, hydrotreated wood and/or other plant based oil, hydrotreated animal fat, hydrotreated fish fat and oil, hydrotreated algae oil, hydrotreated microbial oil, hydrotreated recyclable waste, hydrotreated recyclable residue, or a combination thereof.

6. The composition according to claim 1, wherein in said renewable paraffinic diesel component, an amount of the paraffinic $C_{15}$-$C_{18}$ hydrocarbons is at least 70 vol-%.

7. The composition according to claim 1, wherein in said renewable paraffinic diesel component, an amount of the paraffinic component in a range of carbon number $C_3$-$C_{14}$ is less than 25 vol-%.

8. The composition according to claim 1, wherein in said renewable paraffinic diesel component, an amount of the paraffinic component in a range of carbon number $C_{19}$-$C_{24}$ is less than 25 vol-%.

9. The composition according to claim 1, wherein in said renewable paraffinic diesel component, an amount of the paraffinic $C_{15}$-$C_{18}$ hydrocarbons is at least 80 vol-%.

10. The composition according to claim 1, wherein in said renewable paraffinic diesel component, an amount of the paraffinic $C_{15}$-$C_{18}$ hydrocarbons is at least 90 vol-%.

11. The composition according to claim 2, wherein said oxygenate component is selected from a group consisting of:
di-n-nonyl ether, di-n-dekyl ether, di-n-octyl ether, di-n-heptyl ether, di-n-pentyl ether, di-n-hexyl ether, ethyl-dodecyl ether, ethyl-undecyl ether, ethyl-decyl ether, ethyl-octyl ether, propyl-dodecyl ether, propyl-undecyl ether, propyl-decyl ether, propyl-nonyl ether, propyl-octyl ether, propyl-heptyl ether, butyl-dodecyl ether, butyl-undecyl ether, butyl-nonyl ether, butyl-heptyl ether, butyl-hexyl ether, pentyl-dodecyl ether, pentyl-undecyl ether, pentyl-nonyl ether, pentyl-octyl ether, pentyl-heptyl ether, or pentyl-hexyl ether, ethyl-nonyl ether, butyl-dekyl ether, pentyl-dekyl ether, octyl-tert-butyl ether, dodecyl-tert-butyl ether, ethyl-hexyl-tert-butyl ether, di-ethylhexyl ether, and mixtures thereof.

12. The composition according to claim 11, wherein said oxygenate component comprises:
di-n-pentyl ether.

13. The composition according to claim 12, wherein said renewable paraffinic diesel component comprises:
hydrocarbons produced from biomass by hydrotreatment of vegetable oil, animal fat, fish fat, fish oil, algae oil, microbial oil and/or wood and/or other plant based oil as well as recyclable waste and/or residue or a combination thereof to obtain a paraffinic $C_9$-$C_{24}$ hydrocarbon fraction, optionally followed by isomerization, or a combination thereof.

14. The composition according to claim 13, wherein said renewable paraffinic diesel component comprises:
hydrotreated vegetable oil, hydrotreated wood and/or other plant based oil, hydrotreated animal fat, hydrotreated fish fat and oil, hydrotreated algae oil, hydrotreated microbial oil, hydrotreated recyclable waste, hydrotreated recyclable residue, or a combination thereof.

15. The composition according to claim 14, wherein in said renewable paraffinic diesel component, an amount of the paraffinic $C_{15}$-$C_{18}$ hydrocarbons is at least 70 vol-%.

16. The composition according to claim 15, wherein in said renewable paraffinic diesel component, an amount of the paraffinic component in a range of carbon number $C_3$-$C_{14}$ is less than 25 vol-%.

17. The composition according to claim 16, wherein in said renewable paraffinic diesel component, an amount of the paraffinic component in a range of carbon number $C_{19}$-$C_{24}$ is less than 25 vol-%.

18. A method for producing a fuel composition having:
a) a fossil diesel component;
b) an oxygenate component in an amount from 1 vol-% to 10 vol-%, of a total fuel composition volume, wherein:
  i. said oxygenate is a monoether having a molar mass from 128 to 300 g/mol, and
  ii. said oxygenate is of a structure:

$$R_1\text{—}O\text{—}R_2 \qquad \text{(formula 1)},$$

in which formula $R_1$ and $R_2$ are same or different and selected from $C_1$-$C_{15}$ alkyl groups; and
c) a renewable paraffinic diesel component in an amount from 5 vol-% to 15 vol-% of the total fuel composition volume;
wherein a sum amount of said oxygenate component and said renewable paraffinic diesel component is from 6 to 25 vol-%, of the total fuel composition volume;
wherein the renewable paraffinic diesel component is produced by
hydrogenation or deoxygenation of vegetable oil, animal fat, fish fat, fish oil, algae oil, microbial oil and/or wood and/or other plant based oil as well as recyclable waste and/or residue or a combination thereof to obtain a paraffinic $C_9$-$C_{24}$ hydrocarbon fraction, which is optionally subjected to isomerization;
and
blending the renewable paraffinic diesel component thereby obtained, a monoether oxygenate component having molar mass from 128 to 300 g/mol, and fossil diesel component.

19. The method according to claim 18, wherein the feedstock for renewable paraffinic diesel component comprises:
vegetable oil, wood and/or other plant based oil, animal fat, fish fat and oil, algae oil, microbial oil, recyclable waste, recyclable residue, or a combination thereof.

20. A method for reducing NOx emissions, the method comprising:

blending an oxygenate component and a renewable paraffinic diesel component as fuel blending components to fossil fuel for reducing NOx emissions, wherein a total fuel composition includes:

from 1 vol-% to 10 vol-% of a monoether oxygenate component having molar mass from 128 to 300 g/mol and from 5 vol-% to 15 vol-% renewable paraffinic diesel and a sum amount of said oxygenate component and said renewable paraffinic diesel component is from 6 to 25 vol-% of the total fuel composition, and wherein the renewable paraffinic diesel is produced by a hydrogenation process of vegetable oil, animal fat, fish fat, fish oil, algae oil, microbial oil and/or wood and/or other plant based oil, recyclable waste and/or residue or a combination thereof, or by a hydrodeoxygenation-isomerization process thereof.

* * * * *